United States Patent
Diamant et al.

(10) Patent No.: US 10,678,479 B1
(45) Date of Patent: Jun. 9, 2020

(54) REGISTERS FOR RESTRICTED MEMORY

(71) Applicant: Amazon Technologies, Inc., Seattle, WA (US)

(72) Inventors: Ron Diamant, Albany, CA (US); Randy Renfu Huang, Morgan Hill, CA (US); Sundeep Amirineni, Austin, TX (US); Jeffrey T. Huynh, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 2 days.

(21) Appl. No.: 16/204,943

(22) Filed: Nov. 29, 2018

(51) Int. Cl.
*G06F 12/00* (2006.01)
*G06F 3/06* (2006.01)
*G06F 13/28* (2006.01)
*G06N 3/02* (2006.01)

(52) U.S. Cl.
CPC .......... *G06F 3/0659* (2013.01); *G06F 3/0604* (2013.01); *G06F 3/0644* (2013.01); *G06F 3/0679* (2013.01); *G06F 13/28* (2013.01); *G06N 3/02* (2013.01); *G06F 2213/28* (2013.01)

(58) Field of Classification Search
None
See application file for complete search history.

(56) References Cited

U.S. PATENT DOCUMENTS

2010/0287357 A1* 11/2010 Vishkin ................... G06F 9/383
712/207

* cited by examiner

*Primary Examiner* — Ryan Bertram
*Assistant Examiner* — Trang K Ta
(74) *Attorney, Agent, or Firm* — Kilpatrick Townsend & Stockton LLP

(57) ABSTRACT

Provided are integrated circuits and methods for operating integrated circuits. An integrated circuit can include a plurality of memory banks and an execution engine including a set of execution components. Each execution component can be associated with a respective memory bank, and can read from and write to only the respective memory bank. The integrated circuit can further include a set of registers each associated with a respective memory bank from the plurality of memory banks. The integrated circuit can further be operable to load to or store from the set of registers in parallel, and load to or store from the set of registers serially. A parallel operation followed by a serial operation enables data to be moved from many memory banks into one memory bank. A serial operation followed by a parallel operation enables data to be moved from one memory bank into many memory banks.

22 Claims, 9 Drawing Sheets

900

Reading values in parallel from memory banks of the integrated circuit device, wherein reading in parallel results in a value being read from each of the memory banks
902

Loading the values into a set of registers of the integrated circuit device, wherein each register loads a value from a respective memory bank
904

Reading the values from the set of registers serially, wherein reading serially results in the values being read from each of the set of registers
906

Writing the values to one memory bank from the memory banks
908

Reading the values from the one memory bank into an execution engine of the integrated circuit device, the execution engine including a set of execution components, wherein each execution component is associated with a memory bank from the memory banks, wherein each execution component can read or write to only the memory bank with which the execution component is associated, and wherein the values are read into an execution component associated with the one memory bank
910

REGISTERS FOR RESTRICTED MEMORY

BACKGROUND

In designing an integrated circuit, certain possibly conflicting considerations can affect choices made in the design. For example, the circuit may need to fit within a certain size or area, which may be dictated by the process technology used to build the circuit and/or applications in which the circuit is to be used. As another example, the circuit may need to meet certain timing requirements to perform the operations for which the circuit is designed. As another example, excessive complexity may result in the circuit taking too long to be developed to be useful when the circuit goes into production.

On-chip memory is one component where design considerations may require limitations be placed on the implementation of the memory. For example, area requirements may limit the size of memory components of an integrated circuit. Area may further limit access to the memory by other components of the integrated circuit, since wiring ports of the memory to the other components may require a large amount of space. Wiring a memory to multiple components in the circuit may also result in long wires, which may cause issues with timing due to the time required for signals to traverse the wires. Wiring and timing issues may be alleviated by a circuit such as a crossbar, but a crossbar may require a large amount of area on the chip.

For these and other reasons, certain restrictions may be placed on the on-board memory of an integrated circuit. For example, the memory may be divided into partitions, instead of being implemented using one monolithic memory component. As a further example, an execution component of the integrated circuit may be wired to one memory partition, so that the execution component can read and write to the one memory partition, but is not wired to others of the memory partitions. In this example, the execution component has access to memory for input and output needs, but the amount of wiring needed in the design, and the length of these wires, can be reduced.

BRIEF DESCRIPTION OF THE DRAWINGS

Various embodiments in accordance with the present disclosure will be described with reference to the drawings, in which:

FIG. 9 includes a flowchart illustrating an example of a process for operating an integrated circuit device.

DETAILED DESCRIPTION

Figure 1:
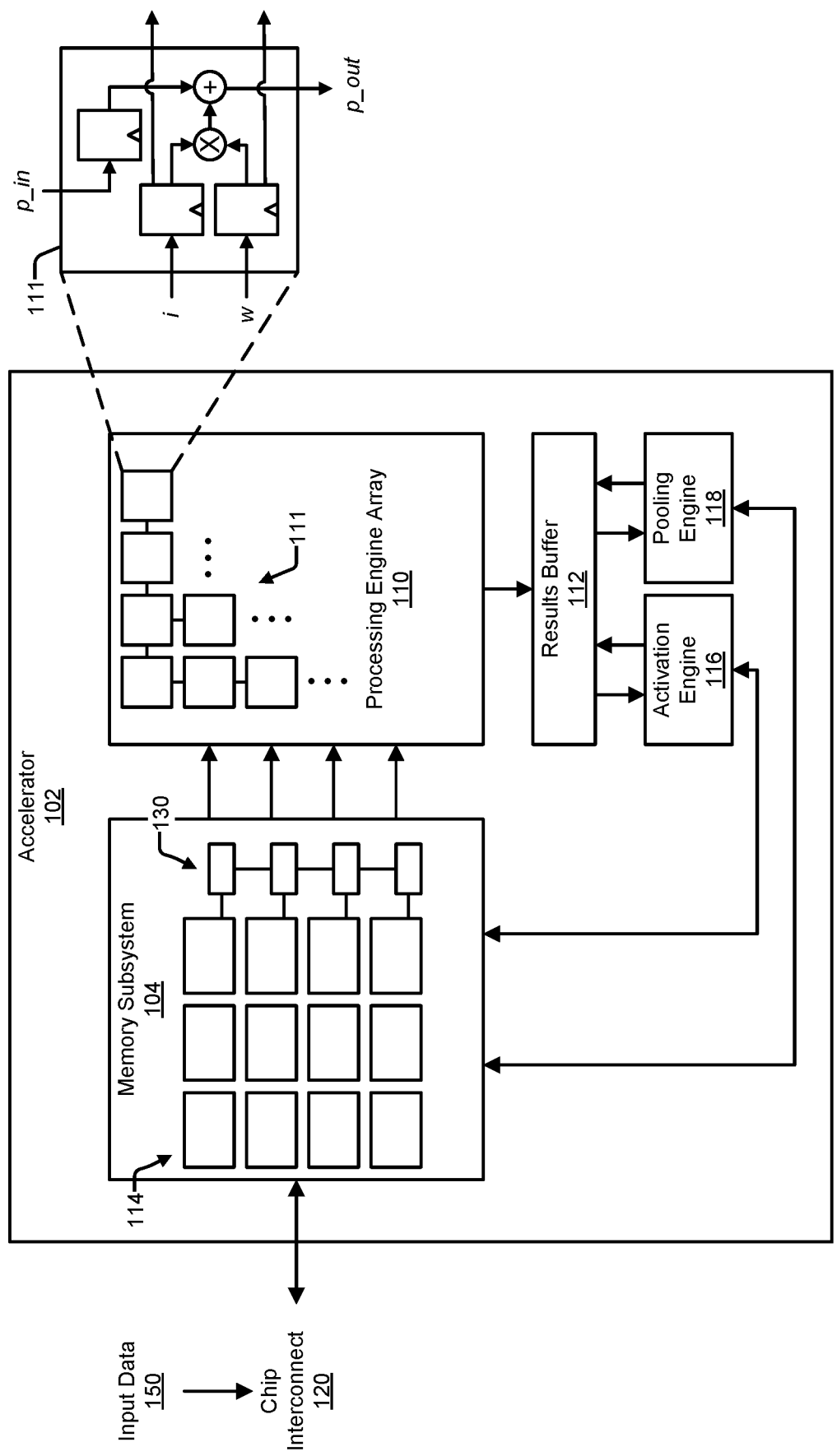
FIG. 1 includes a block diagram that illustrates an example of an accelerator.

An integrated circuit device can include local memory for storing data on which components of the circuit are to operate and the for the output of these operations. To simplify the implementation of the integrated circuit, the memory can be divided into separate partitions or banks, where a partition or bank is a physically separate memory component. The memory banks can each have a separate address space, such that each memory bank is individually addressable. For example, one burst write transaction would not be able to write data across two memory banks without circuitry that enables the transaction to be divided into individual transactions for each of the two memory banks.

Physically partitioning the memory in an integrated circuit device can be advantageous for several reasons. For example, each of the different memory clients in the integrated circuit can be assigned to or associated with (e.g., by being wired to) a different memory bank. In this example, each execution component is provided with a memory from which the component can read input data and to which the component can write output data. An alternative would be to implement the integrated circuit device with a single memory, which then would need to be wired to each of the memory clients in the device. In this alternative, chip area may become congested with wiring, and the length of the wires may cause timing issues.

Partitioning memory between the execution components of the integrated circuit may result in an execution component not being able to access the memory bank assigned to a different execution component. This limitation may be acceptable for some operations of the integrated circuit, but may be problematic for others. For example, a computation to be performed by the integrated circuit can include a parallel computation that results in n values being stored in n memory banks. In this example, performing these computations in parallel may be the most efficient way for the integrated circuit to computing the values. The next computation, however, may be a combining of the n values, which would need to be performed by one execution component. In this example, the memory partitioning may result in the one execution component not being able to access the n values without multiple and possibly inefficient data movements between the memory banks.

In various implementations, provide are integrated circuit devices and methods for operating integrated circuit devices that include memory that has been physically divided into separate partitions or banks, where access to the memory banks is limited. In various examples, the integrated circuit device can include a set of registers. The integrated circuit device can further include functionality (e.g., in the form of circuitry) that enables the device to load data from the memory banks in parallel to the set of registers, so that the registers are each loaded with a value from a different memory bank. The integrated circuit can further store values obtained from the set of registers in parallel to the memory banks. In the parallel load and store, the integrated circuit device can maintain the division between the memory banks.

The integrated circuit may further include functionality that enables the integrated circuit to serially load and store to and from the set of registers. A serial load can include reading values from one memory bank and serially writing the values to each of the set of registers. A serial store can include reading values from each of the set of registers and writing the values to one memory bank. A parallel load to the set of registers followed by a serial store to a memory bank can thus enable the integrated circuit to move data from multiple memory banks to one memory bank. Similarly, a serial load followed by a parallel store can enable the integrated circuit to move data from one memory bank to multiple memory banks. To support these operations, the instruction set for the integrated circuit device can include load and store instructions for the set of registers.

Use of registers for moving data between the memory banks can be a better solution than alternatives, such as using a single memory, wiring each memory bank to each execution component, or adding a crossbar to the device. For example, the registers and circuitry to move data into and out of the registers may require only a minimal amount of chip area, as compared to wiring each memory bank to each execution component or adding a crossbar. As another example, by having a register for each memory bank, the registers can be kept close to the memory banks and thus wiring between the memory banks and the registers can be kept short. As a further example, though serially reading the registers may require one clock cycle per register being read, the time required to read the registers may nevertheless be small compared to the time the device may be spending performing more complex computations.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

FIG. 1 includes a block diagram that illustrates an example of an accelerator 102. The accelerator 102 is an example of an integrated circuit device with memory that has been physically divided into separate memory banks 114, where different memory clients (e.g., different components of the accelerator 102 that use memory) can be assigned to different memory banks 114, as discussed further below. In various examples, the accelerator 102 is an integrated circuit component of a processor. The processor can have other integrated circuit components, including additional accelerators.

In various implementations, the accelerator 102 can include a memory subsystem 104 and a computational array, which can also be referred to as a processing engine array 110. When in operation (e.g., when computing a result for a set of input data 150), the processing engine array 110 can read values from the memory subsystem 104. The processing engine array 110 can output computation results to a results buffer 112. In some cases, the example accelerator 102 can perform an activation function (using an activation engine 116) and/or pooling (using a pooling engine 118) on the results from the processing engine array 110, before the results are written to the memory subsystem 104.

In various implementations, the memory subsystem 104 can include multiple memory banks 114. In these implementations, each memory bank 114 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 114. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 104 can permit simultaneous access to the read or write channels of multiple memory banks. As another example, the memory subsystem 104 can include arbitration logic such that arbitration between, for example, the outputs of multiple memory banks 114 can result in more than one memory bank's output being used. In these and other examples, though globally managed by the memory subsystem 104, each memory bank can be operated independently of any other.

Having the memory banks 114 be independently accessible can increase the efficiency of the accelerator 102. For example, values can be simultaneously read and provided to each row of the processing engine array 110, so that the entire processing engine array 110 can be in use in one clock cycle. As another example, the memory banks 114 can be read at the same time that results computed by the processing engine array 110 are written to the memory subsystem 104. In contrast, a single memory may be able to service only one read or write at a time. With a single memory, multiple clock cycles can be required, for example, to read input data for each row of the processing engine array 110 before the processing engine array 110 can be started.

In various implementations, the memory subsystem 104 can be configured to simultaneously service multiple clients, including the processing engine array 110, the activation engine 116, the pooling engine 118, and any external clients that access the memory subsystem 104 over a communication fabric 120. In some implementations, being able to service multiple clients can mean that the memory subsystem 104 has at least as many memory banks as there are clients. In some cases, each row of the processing engine array 110 can count as a separate client. In some cases, each column of the processing engine array 110 can output a result, such that each column can count as a separate write client. In some cases, output from the processing engine array 110 can be written into the memory banks 114 that can then subsequently provide input data for the processing engine array 110. As another example, the activation engine 116 and the pooling engine 118 can include multiple execution channels, each of which can be separate memory clients. The memory banks 114 can be implemented, for example, using static random access memory (SRAM).

In various examples, the memory subsystem 104 can include a set of registers 130 for temporary storage of data. The memory subsystem 104 can include, for example, a register for each of the memory banks 114 or for a subset of the memory banks 114. In some examples, there is a one-to-one correspondence between each register and a memory bank, such that data can be moved between one register and a corresponding memory bank, and cannot be moved between the register and a different memory bank. In these and other examples, the memory subsystem 104 may be able to read values from each of the registers 130, independently of the registers' association with the memory banks 114. For example, the registers 130 may be chained, such that a value can be read from one register and be written to a neighboring register. Alternatively or additionally, the memory subsystem 104 can include circuitry that can read from one or more of the registers 130 and can write to one or more of the registers 130.

Using the registers 130, the memory subsystem 104 can, for example, copy data from a set of memory banks 114 and store the data in the registers 130. In this example, the memory subsystem 104 can later copy the data from the registers 130 back into the memory banks 114. The registers 130 may support parallel and serial reads or writes. For example, in parallel mode, the memory subsystem 104 can read two or more of the memory banks 114 at the same time, and store the data that is read into respective registers. In this example, the memory subsystem 104 can also copy data from one or more of the registers into respective memory banks. As a further example, in serial mode, the memory subsystem 104 can read multiple values from one memory bank and store the values into the registers 130, with each value being stored in a different register. In this example, the memory subsystem 104 can also copy values from each of two or more of the registers 130, and write these values to one memory bank. As discussed further below, the memory subsystem 104 can use parallel and serial operations to move data between the memory banks 114.

In various implementations, the memory subsystem 104 can include control logic. The control logic can, for example, keep track of the address spaces of each of the memory banks 114, identify memory banks 114 to read from or write to, and/or move data between the memory banks 114 and a set of registers 130. In some implementations, memory banks 114 can be hardwired to particular clients. For example, a set of memory banks 114 can be hardwired to provide values to the rows of the processing engine array 110, with one memory bank servicing each row. As another example, a set of memory banks can be hired wired to receive values from columns of the processing engine array 110, with one memory bank receiving data for each column.

In various examples, the registers 130 can, alternatively, be located in a different component of the accelerator, such as, for example, the pooling engine 118. In this example, the pooling engine 118 can include control logic for moving data into or out of the registers 130. Other examples of components of the accelerator where the registers can be located include the activation engine 116, the results buffer 112, or another component that is not illustrated here.

The processing engine array 110 is the computation matrix of the example accelerator 102. The processing engine array 110 can, for example, execute parallel integration, convolution, correlation, and/or matrix multiplication, among other things. The processing engine array 110 includes multiple processing engines 111, arranged in rows and columns, such that results output by one processing engine 111 can be input directly into another processing engine 111. Processing engines 111 that are not on the outside edges of the processing engine array 110 thus can receive data to operate on from other processing engines 111, rather than from the memory subsystem 104.

In various examples, the processing engine array 110 uses systolic execution, in which data arrives at each processing engine 111 from different directions at regular intervals. In some examples, input data can flow into the processing engine array 110 from the left and weight values can be loaded at the top. In some examples weights and input data can flow from the left and partial sums can flow from top to bottom. In these and other examples, a multiply-and-accumulate operation moves through the processing engine array 110 as a diagonal wave front, with data moving to the right and down across the array. Control signals can be input at the left at the same time as weights 106, and can flow across and down along with the computation.

In various implementations, the number of columns in the processing engine array 110 determines the computational capacity of the processing engine array 110, and the number of rows determines the required memory bandwidth for achieving maximum utilization of the processing engine array 110. The processing engine array 110 can have, for example, 64 columns and 428 rows, or some other number of columns and rows.

An example of a processing engine 111 is illustrated in FIG. 1 in an inset diagram. As illustrated by this example, a processing engine 111 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 111.

In the illustrated example, an input from above can include a partial sum, p_in, provided either from another processing engine 111 or from a previous round of computation by the processing engine array 110. When starting a computation for a new set of input data, the top row of the processing engine array 110 can receive a fixed value for p_in, such as zero. As illustrated by this example, i and w are multiplied together and the result is summed with p_in to produce a new partial sum, p_out, which can be input into another processing engine 111. Various other implementations of the processing engine 111 are possible.

Outputs from the last row in the processing engine array 110 can be temporarily stored in the results buffer 112. The results can be intermediate results, which can be written to the memory banks 114 to be provided to the processing engine array 110 for additional computation. Alternatively, the results can be final results, which, once written to the memory banks 114 can be read from the memory subsystem 104 over the communication fabric 120, to be output by the system.

In some implementations, the accelerator 102 includes an activation engine 116. In these implementations, the activation engine 116 can combine the results from the processing engine array 110 into one or more output activations. For example, for a convolutional neural network, convolutions from multiple channels can be summed to produce an output activation for a single channel. In other examples, accumulating results from one or more columns in the processing engine array 110 may be needed to produce an output activation for a single node in the neural network. In some examples, activation engine 116 can be bypassed.

In various examples, the activation engine 116 can include multiple separate execution channels. In these examples, the execution channels can correspond to the columns of the processing engine array 110, and can perform an operation on the outputs of a column, the result of which can be stored in the memory subsystem 104. In these examples, the activation engine 116 may be able to perform between 1 and n parallel computations, where n is equal to the number of columns in the processing engine array 110. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 102 can include a pooling engine 118. Pooling is the combining of outputs of the columns of the processing engine array 110. Combining can include for example, computing a maximum value, a minimum value, an average value, a median value, a summation, a multiplication, or another logical or mathematical combination. In various examples, the pooling engine 118 can include multiple execution channels that can operating on values from corresponding columns of the processing engine array 110. In these examples, the pooling engine 118 may be able to perform between 1 and n parallel computations, where n is equal to the number of columns in the processing engine array 110. In various examples, execution channels of the pooling engine 118 can operate in parallel and/or simultaneously. In some examples, the pooling engine 118 can be bypassed.

Herein, the activation engine 116 and the pooling engine 118 may be referred to collectively as execution engines. The processing engine array 110 is another example of an execution engine. Another example of an execution engine is a Direct Memory Access (DMA) engine, which may be located outside the accelerator 102.

Input data 150 can arrive over the communication fabric 120. The communication fabric 120 can connect the accelerator 102 to other components of a processor, such as a DMA engine that can obtain input data 150 from an Input/Output (I/O) device, a storage drive, or a network interface. The input data 150 can be, for example one-dimensional data, such as a character string or numerical sequence, or two-dimensional data, such as an array of pixel values for an image or frequency and amplitude values over time for an audio signal. In some examples, the input data 150 can be three-dimensional, as may be the case with, for example, the situational information used by a self-driving car or virtual reality data. In some implementations, the memory subsystem 104 can include a separate buffer for the input data 150. In some implementations, the input data 150 can be stored in the memory banks 114 when the accelerator 102 receives the input data 150.

In some examples, the accelerator 102 can implement a neural network processing engine. In these examples, the accelerator 102, for a set of input data 150, can execute a neural network to perform a task for which the neural network was trained. Executing a neural network on a set of input data can be referred to as inference or performing inference.

The weights for the neural network can be stored in the memory subsystem 104, along with input data 150 on which the neural network will operate. The neural network can also include instructions, which can program the processing engine array 110 to perform various computations on the weights and the input data. The instructions can also be stored in the memory subsystem 104, in the memory banks 114 or in a separate instruction buffer. The processing engine array 110 can output intermediate results, which represent the outputs of individual layers of the neural network. In some cases, the activation engine 116 and/or pooling engine 118 may be enabled for computations called for by certain layers of the neural network. The accelerator 102 can store the intermediate results in the memory subsystem 104 for inputting into the processing engine array 110 to compute results for the next layer of the neural network. The processing engine array 110 can further output final results from a last layer of the neural network. The final results can be stored in the memory subsystem 104 and then be copied out to host processor memory or to another location.

Figure 2:
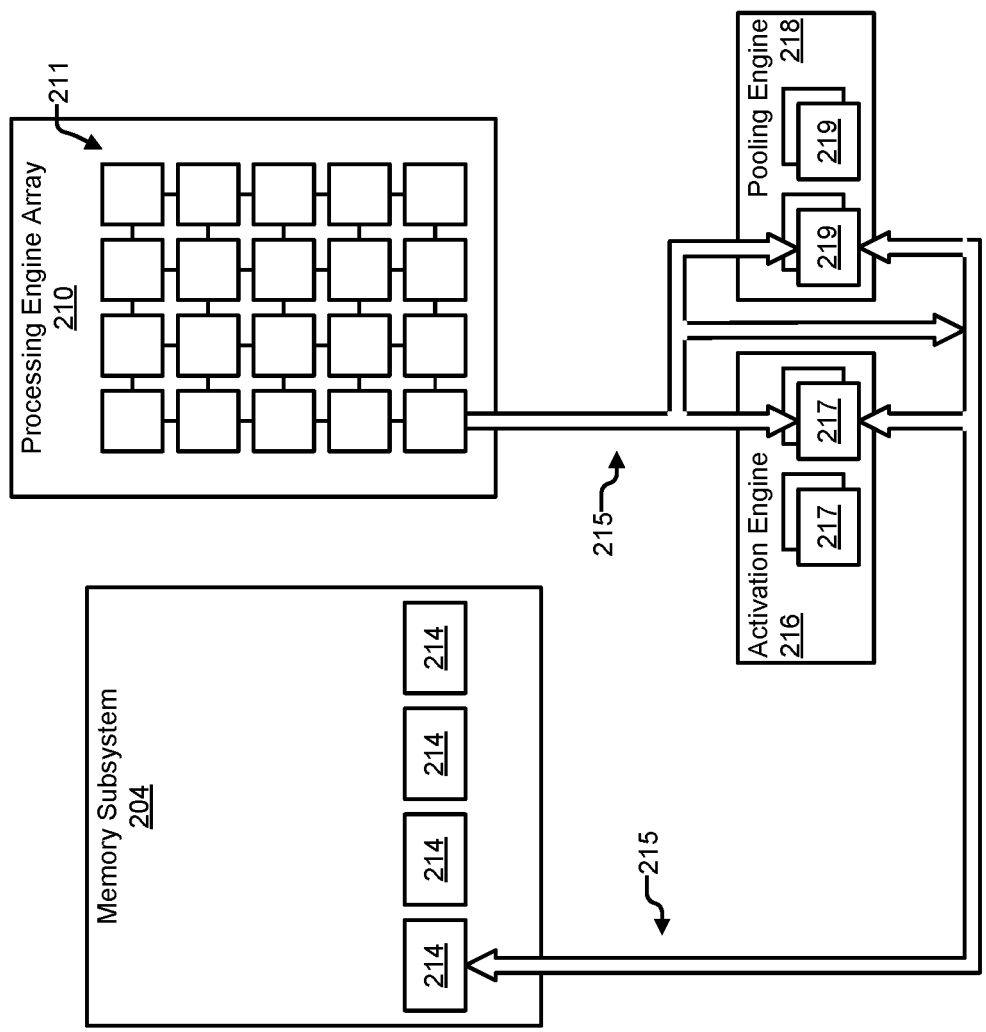
FIG. 2 includes a block diagram that illustrates in greater detail an example of the connectivity between the memory subsystem, processing engine array, the activation engine, and the pooling engine.

FIG. 2 includes a block diagram that illustrates in greater detail an example of the connectivity between the memory subsystem 204, processing engine array 210, the activation engine 216, and the pooling engine 218 of the accelerator illustrated in FIG. 1.

As illustrated in FIG. 2, the processing engine array 210 includes processing engines 211 arranged in rows and columns. For the sake of clarity, five rows and four columns are illustrated, with the understanding that the processing engine array 210 can have more or fewer rows and columns. Operations performed by the processing engine array 210 can result in each column of processing engines 211 outputting a separate result. For example, the processing engine array 210 may be able to perform matrix multiplication, in which case each column can output the result for different indices of an input matrix.

In various examples, the output of each column may further be operated on by the activation engine 216 and/or the pooling engine 218. For example, the activation engine 216 may perform an identity function on the indices of a matrix, or the pooling engine 218 may accumulate the values of a matrix. To perform these and other operations, the activation engine 216 can include multiple activation components 217 and the pooling engine 218 can include multiple pooling components 219. The activation components 217 and the pooling components 219 may be referred to herein collectively as execution components. In various examples, the activation engine 216 and the pooling engine 218 an each include an execution component for each of the columns of the processing engine array 210. Having as many activation components 217 and pooling components 219 as there are columns enables the activation engine 216 and the pooling engine 218 to operate in parallel on the outputs of the processing engine array 210, which can result in more efficient operation of the activation engine 216 and the pooling engine 218.

To store the outputs of the processing engine array 210, activation engine 216, and the pooling engine 218, a memory bank 214 in the memory subsystem 204 can be assigned to or associated with each column of the processing engine array 210 and the activation component and pooling component that can operated on the output of the column. In the example of FIG. 2, only four memory banks are illustrated, with the understanding that the 204 can include more memory banks that may be dedicated to other memory clients. The data path including the output of one column, one activation component 217, one pooling component 219, and one memory bank 214 is referred to herein as a channel 215, data channel, or execution channel. For the sake of clarity, only one channel 215 is illustrated in FIG. 2, with the understanding that the accelerator can include a channel for each column of the processing engine array 210. In various examples, the channels can operate independently, with the computations being performed in one channel not affecting or depending on the operations of another channel. In various examples, the activation engine 216 and the pooling engine 218 can further use the channel 215 to read data from the memory bank 214 as well as to write data the memory bank 214.

In various examples, a set of memory banks 214 in the memory subsystem 204 can be dedicated to each channel. This simplifies the implementation of the channels while providing each channel with memory for storing data that is being operated on. For example, each channel does not need to be wired to each memory bank, which reduces area requirements for wiring and timing issues that may arise from long wires. As another example, arbitrating between the channels to decide which should get access to a memory bank is eliminated.

The dedicated memory banks, however, disable the channels from sharing memory, meaning that one channel is not able to read the data in another channel's memory bank and is not able to write data to another channel's memory bank. For many operations performed by the processing engine array 210, activation engine 216, and the pooling engine 218, this limitation is not an obstacle, but some operations may be more efficiently performed if a channel can access the memory bank of another channel.

An example of such an operation is the softmax function. Softmax is a computation that can be used for operations such as accumulating the outputs of a layer of a neural network. Softmax can be used, for example, in the last layer of a neural network to turn a set of floating point values into probabilities. An example of the softmax function is as follows:

$$Softmax(X_k) = \frac{\exp(X_k)}{\sum_j \exp(X_j)}$$

In the above function, X represents and element over which softmax is to be performed, and k is the index of each element. The function can be performed by the accelerator in a series of steps. First, the activation engine 216 can reading each of $X_1 \ldots X_k$ from the memory banks (or obtaining these elements from the processing engine array 210) into an activation component 217, executing the exponential function on each respective element, and writing a result $tmp1_1 \ldots tmp1_k$ back to the memory banks. In this step, each channel performs the exponential function on an element.

The second step would be to perform a summation of the results $tmp1_1 \ldots tmp1_k$, which can be performed by the pooling engine 218, but because the results are in different memory banks, the pooling engine 218 is not able to obtain the values on which to operate.

Figure 3:
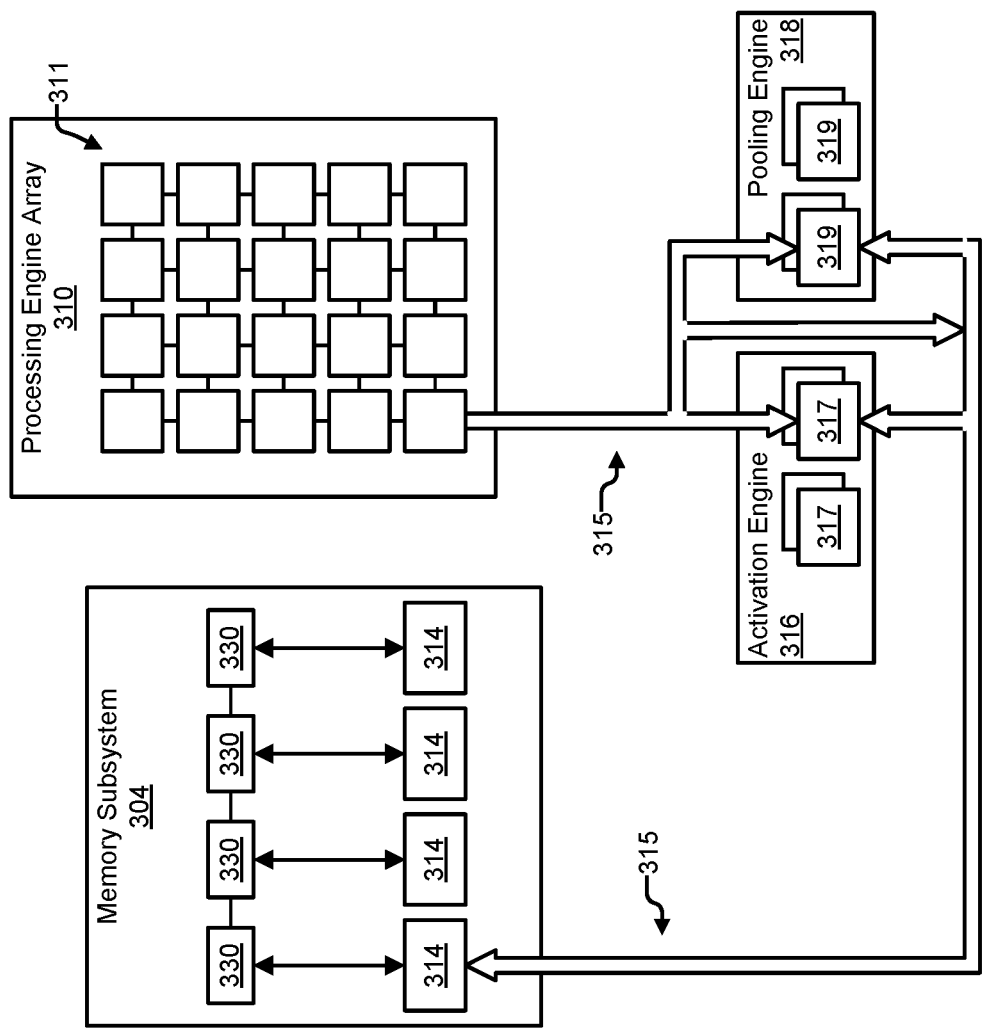
FIG. 3 illustrates the connectivity between the memory subsystem, processing engine array, activation components of the activation engine, and pooling components of the pooling engine.
Figure 4:
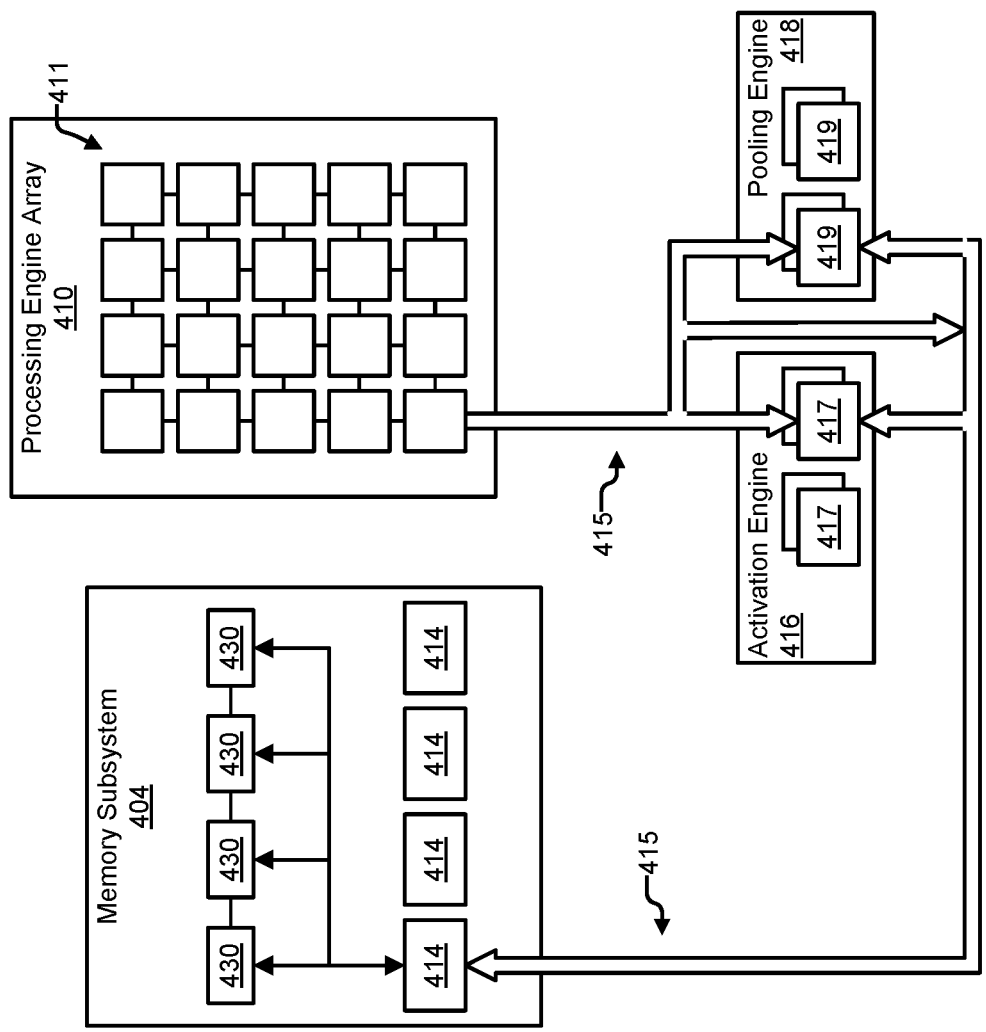
FIG. 4 also illustrates the connectivity between the memory subsystem, processing engine array, activation components of the activation engine, and pooling components of the pooling engine.

FIG. 3 and FIG. 4 include block diagrams that illustrate an example of registers that can be used to move data between the memory banks. FIG. 3 illustrates the connectivity between the memory subsystem 304, processing engine array 310, activation components 317 of the activation engine 316, pooling components 319 of the pooling engine 318, where the data path including the output of one column of the processing engine array 310, one activation component 317, one pooling component 319, and one memory bank 314 form a channel 315. For the sake of clarity, the processing engine array 310 is illustrated as having processing engines 311 forming five rows and four columns, with the understanding that the processing engine array 310 can include more or fewer rows and columns. Additionally, for the sake of clarity, only one channel 315 is illustrated, with the understating that the accelerator can include a data channel for each column of the processing engine array 310.

In the example of FIG. 3, the memory subsystem 304 includes a set of registers 330, with the set including a register 330 for each channel. Each register 330 may be able to store one data word (e.g., a 32-bit, 64-bit, or 128-bit value, or a value of a different size), a cache line, a memory block, and/or another amount of data that represents a minimum amount of data that can be read from or written to a memory bank 314 or a multiple of the minimum amount.

FIG. 3 further illustrates one mode in which the memory subsystem 304 can be made to use the registers 330. In the example of FIG. 3, the memory subsystem 304 can read or load data in parallel from the memory banks 314. Reading in parallel means that data is read from each of the memory banks 314 and loaded into a corresponding register 330. The reading can occur simultaneously, such as in the same clock cycle or series of clock cycles (e.g., one cycle to set up the read and a second cycle to obtain the data). Similarly, the memory subsystem 304 can also write or store data in parallel, where writing in parallel results in data from each of the registers 330 being written to a corresponding memory bank 314. The writing can also occur simultaneously to each memory bank 314 in the same clock cycle or series of clock cycles.

To enable the parallel load and store (e.g. read from memory and write to memory) operations, the memory subsystem 304 can include a register load instruction and a register store instruction. These instructions can include a parameter that can be used to specify the parallel mode. In some examples, the instructions can include additional parameters for which memory banks to access (and thus, correspondingly which registers will be loaded or from which data will be stored) and for specifying addresses in the memory banks 314, among other possible parameters. In some examples, the instruction can include one address parameter, which can be used as an offset within the address space of each memory bank when reading from or writing to each memory bank. In some examples, the instruction can include multiple address parameters, one for each memory bank, which can be offsets or absolute addresses. In these examples, the instruction may allowing for some address parameters to be left unspecified. In these and other examples, the number of memory banks accessed can be fewer than the number of memory banks dedicated to the channels.

FIG. 4 also illustrates the connectivity between the memory subsystem 404, processing engine array 410, activation components 417 of the activation engine 416, pooling components 419 of the pooling engine 418, where the data path including the output of one column of the processing engine array 410, one activation component 417, one pooling component 419, and one memory bank 414 form a channel 415. For the sake of clarity, a small number of processing engines 411, memory banks 414, and channel 415 are illustrated. As in the example of FIG. 3, the memory subsystem 404 of FIG. 4 includes a set of registers 430, with the set including one register 430 for each channel.

FIG. 4 further illustrates another mode in which the memory subsystem 404 can be made to use the registers 430. In this example, the memory subsystem 404 can read data from a memory bank 414, and serially load the data into the registers 430. Reading the memory bank 414 can include performing a series of reads, with the data obtained for each read being loaded into a different register 430. In a serial load, only one memory bank 414 is read. The memory subsystem 404 can further serially store the data in the registers 430 to one memory bank 414. In a serial store operation, the memory subsystem 404 can read a value from one or more of the registers 430, and perform a series of writes to put the data into the memory bank 414.

To enable serial load and store operations, the register load and register store instructions of the memory subsystem 404 can include a parameter that can be used to specify the serial mode. The instructions can further include parameters for specifying which registers to use in the operation (which may be fewer than all of the registers), which memory bank 414 is to be accessed, an address for the memory bank 414, and/or an amount of data to load to or store from each register, among other possible parameters. In various examples, a component of the accelerator other than the memory subsystem 404, such as an instruction execution unit, can implement the register load and store instructions.

Returning to the example of softmax, the set of registers can now enable the accelerator to perform the entire computation. As noted above, the second step is a summation of the results $tmp1_1 \ldots tmp1_k$ of performing the exponential function on each element $X_1 \ldots X_k$. Before performing this operation, the accelerator can be instructed to first perform a parallel register load of $tmp1_1 \ldots tmp1_k$ into the registers, as illustrated in FIG. 3. The accelerator can next be instructed to perform a serial register store of $tmp1_1 \ldots tmp1_k$ into one memory bank, as illustrated in FIG. 4. The values $tmp1_1 \ldots tmp1_k$ can then be read into a pooling component of the pooling engine, which can perform the summation and write a result tmp2 to back to the memory bank.

Having now performed the summation, the third step is to perform the reciprocal function on tmp2, which can be performed by the pooling engine. The value tmp2 can be read from the memory bank and into a pooling component, which can perform the reciprocal function and write a result tmp3 back to the memory bank. The fourth step is to multiply tmp3 to each of $tmp1_1 \ldots tmp1_k$ to produce a final result S. The multiplication can also be performed by the pooling engine, by reading tmp3, and $tmp1_1 \ldots tmp1_k$ into a pooling component configured to perform a multiplication.

In various examples, in addition to the parallel and serial load and store operations illustrated in FIG. 3 and FIG. 4, the memory subsystem may be operable move data between individual registers and/or copy data between registers For example, assuming that the memory subsystem includes eight individual registers and the registers contain the values (0, 1, 2, 3, 4, 5, 6, 7), the memory subsystem may be programmed to reverse the order of the values in the registers, so that the registers contain the values (7, 6, 5, 4, 3, 2, 1, 0). As another example, the memory subsystem may be programmed so that a value in any one register can be copied to another. For example, using the prior example of the registers containing the values (0, 1, 2, 3, 4, 5, 6, 7), the registers can be programmed to have the values (7, 7, 7, 7, 0, 0, 0, 0).

To enable shuffling and/or copying of values between the individual registers, each register can include, for example, a multiplexor at the input of the register. The inputs to the multiplexor can be connected to each of the other registers (as well as the memory bank associated with the register), so that appropriate setting of the select input of the multiplexor enables the register to load a value from any of the other registers (or from the memory bank). Because the select signal to each multiplexor may be individually controllable, setting more than one to select the same register enables copying of data to multiple registers. In some examples, the multiplexor also enables serial loads and stores. For example, for the register that is associated with the memory bank into which values are to be serially stored, the select input for the register's multiplexor can be set to indicate different other registers in successive clock cycles, so that the values in the other registers each get read into the one register, and from the register get written into the memory bank. An example of the inverse operation is as follows: in successive clock cycles, values can be read from one memory bank into the register associated with the memory bank, and, also in successive clock cycles, values can be copied from the one register into successive different registers, until the desired number of values have been read from memory and loaded into the registers.

In various examples, memory subsystem (or another block that includes the registers or implements instructions for the registers) can implement an instruction that allows software to program the multiplexors. The instruction can include, for example, a parameter for specifying a select input for each of the multiplexors. In some examples, the instruction may also allow specifying a "disable" or "don't care" value, such as "x" or "z" for a particular parameter, which can instruct the memory subsystem to hold and not modify the current value in the register associated with the parameter.

In various examples, the registers can be used for other operations. For example, a DMA engine can write a block of data into one memory bank. In this example, the memory subsystem can then perform a serial load into the registers, and then a parallel store to put parts of the block of data into different memory banks. In this example, the registers enable data to be put into multiple memory banks using one DMA transaction. Without the registers, to place data into multiple memory banks may require multiple DMA transactions.

As a further example, the register also enable scatter-gather and gather-scatter, in which data can be obtained from multiple memory banks and placed into a single data stream, or the converse, where data from single data stream is placed into multiple memory banks.

Figure 5:
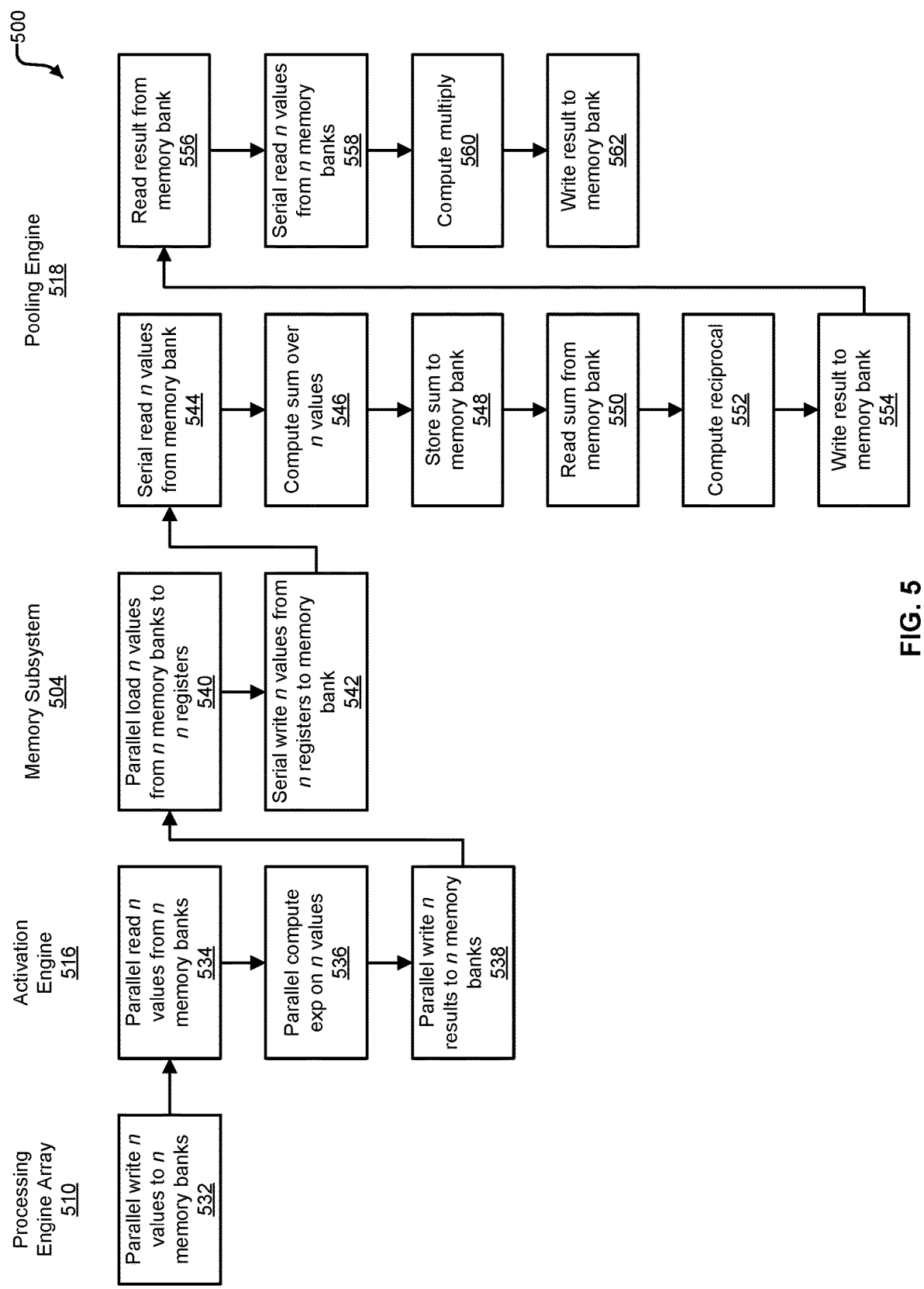
FIG. 5 is a flowchart that illustrates an example of a process that can be executed by the accelerator of FIG. 1 using the set of registers in the memory subsystem.

FIG. 5 is a flowchart that illustrates an example of a process 500 that can be executed by the accelerator of FIG. 1 using the set of registers in the memory subsystem. The process 500 of FIG. 5 involves the processing engine array 510, the memory subsystem 504, and the pooling engine 518. In other examples, one or more of these components may not be needed, or additional components may be used. The process 500 is provided as just one example usage of the set of registers. The set of registers can be used in other processes. Additionally, the result of the process 500 can be achieved using steps other than those illustrated in FIG. 5.

At step 532, the processing engine array 510 writes n values to n memory banks in parallel. For example, the processing engine array 510 may have completed a computation that resulted in one or more columns of the array producing a result. As discussed above, each of these results can be written to the memory banks of the accelerator, with each column writing a value to a different memory bank. Writing the values to the memory banks in parallel can mean that the values are all written in the same clock cycle or within a few clock cycles of one another.

At step 534, the activation engine 516 reads the n values from the n memory banks in parallel. Reading the values in parallel means that a value is read from each of the n memory banks, possibly within the same clock cycle or within a few clock cycles. In this step, the values are each read into a different execution component of the activation engine 516.

At step 536, the activation engine 516 computes the exponential function on each of the n values. The activation engine 516 can have, for example, an multiple execution components that can independently perform a computation on input data. At step 536, n of the execution components can be configured to perform the exponential function. In some examples, the execution components can generate results in the same clock cycle or within a few clock cycles.

At step 538, the activation engine 516 writes the n results of the exponential functions into n memory banks in parallel. As in step 532, the operation of step 538 can include a value being written to each of the n memory banks.

At step 540, the memory subsystem 504 loads the n values written at step 538 into n registers in parallel. Loading the values in parallel can result in one value being read from each of the n memory banks. Additionally, each value read is loaded into a corresponding register, so that reading of n values from the n memory banks results in the n values being loaded into n registers.

At step 542, the memory subsystem 504 writes the n values in the registers serially to one memory bank. Reading the registers serially means that a value is taken from each of the n registers, and sequentially stored into the one memory bank. Once step 542 is complete, the n values have been moved from multiple memory banks to a single memory bank. Additionally, the steps that follow involve the same memory bank.

Step 540 and step 542 are illustrated as being performed by the memory subsystem 504, under the assumption that the registers are located in the memory subsystem 504. In other examples, the registers may be located in a different component, such as the pooling engine 518 or activation engine 516. In these examples, the component that includes the registers (e.g., the pooling engine 518 or the activation engine 516, or another component) can perform step 540 and step 542.

At step 544, the pooling engine 518 now serially reads the n values from the one memory bank. The values can be read into, for example, one execution component among multiple execution components of the pooling engine 518. The pooling engine 518 may have multiple execution components that the pooling engine 518 is able to perform multiple simultaneous and independent computations. At step 546, the execution component that received the values in step 544 computes a sum over the n values. At step 548, the execution component writes the sum to the memory bank.

At step 550, the pooling engine 518 reads the sum back from the memory bank, and at step 552 performs the reciprocal function on the sum. At step 554, the pooling engine 518 writes the result of performing the reciprocal function back to the memory bank.

At step 556, the pooling engine 518 can read the result of the reciprocal function back from the memory bank. At step 558, the pooling engine 518 then serially reads the n values, stored in the memory bank at step 542, out of the memory bank. At step 560, the pooling engine 518 then multiplies together each of the value read in step 556 and step 558. At step 562, the pooling engine 518 writes the result of the multiplication to the memory bank.

The example of FIG. 5 illustrates an operation that is enabled by the set of registers, which provides mechanism through which data can be moved from multiple memory banks to one memory bank. In other examples, data can, conversely, be moved from one memory bank to multiple memory banks. The set of registers thus allow the segregation between the memory banks, and the advantages gained therefrom, to be maintained.

Figure 6:
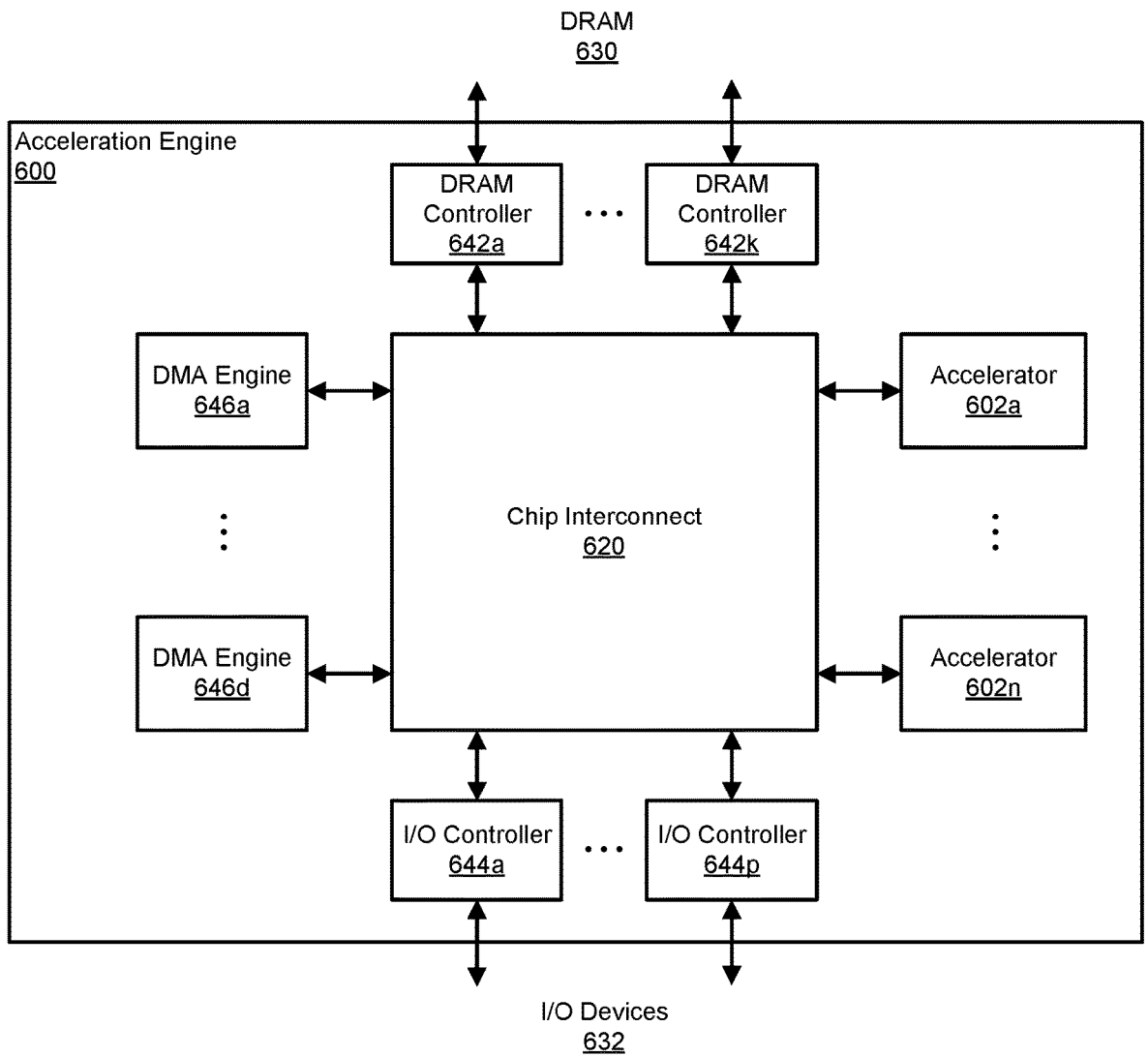
FIG. 6 includes a block diagram that illustrates an example of an acceleration engine.

FIG. 6 includes a block diagram that illustrates an example of an acceleration engine 600, which can include one or more accelerators such as are described in FIGS. 1-4. In the example of FIG. 6, the acceleration engine 600 includes multiple accelerators 602a-602n, each of which can perform a set of operations. In various examples, the accelerators 602a-602n can be purpose built for particular types of operations, so that the accelerators 602a-602n can perform the operations much faster than when similar operations are performed by a general purpose processor. In various examples, to perform a set of operations, input data on which the operations are to be performed must first be moved into the accelerators 602a-602n. Additionally, in some cases, program code is also moved into the accelerators 602a-602n, which programs the operations that the accelerators 602a-602n will perform on the data. In the illustrated example, the acceleration engine 600 includes n accelerators 602a-602n. Examples of accelerators that can be included in the acceleration engine 600 include graphics accelerators, floating point accelerators, neural network accelerators, and others. In various examples, the accelerators 602a-602n can each be the same (e.g., each of the accelerators is a graphics accelerator) or can be different (e.g., the accelerators 602a-602n include a graphics accelerator, a floating point accelerator, and neural network accelerator).

The example acceleration engine 600 further includes DRAM controllers 642a-642k for communicating with an external memory. The external memory is implemented, in this example, using DRAM 630. In the illustrated example, the acceleration engine 600 includes k DRAM controllers 642a-642k, each of which may be able to communicate with an independent set of banks of DRAM. In other examples, other types of RAM technology can be used for the external memory. The DRAM controllers 642a-642k can also be referred to as memory controllers.

In various examples, input data and/or program code for the accelerators 602a-602n can be stored in the DRAM 630. Different programs can cause the accelerators 602a-602n to perform different operations. For example, when one of the accelerators is a neural network accelerator, one program can configure the neural network accelerator to perform speech recognition while another program can configure the neural network accelerator to perform image recognition. In various examples, different accelerators 602a-602n can be programmed with different programs, so that each performs a different set of operations.

The example acceleration engine 600 further includes I/O controllers 644a-644p for communicating with I/O devices 632 in the system. The acceleration engine 600 can communicate with I/O devices over, for example, a processor bus. In some examples, the processor bus can be implemented using Peripheral Component Interconnect (PCI) and/or a variation of the PCI bus protocol. The processor bus can connect the acceleration engine 600 to I/O devices such as, for example, input and output devices, memory controllers, storage devices, and/or network interface cards, among other things. In some examples, the I/O controllers 644-644p can enable the acceleration engine 600 to act as an I/O device for a host processor. For example, the acceleration engine 600 can be the recipient of input data from the host processor, and a command indicating an operation to be performed on the input data (e.g., a particular computation or analysis). In the illustrated example, the acceleration engine 600 includes p I/O controllers 644a-644p, each of which may include a separate root complex and may communicate with a separate set of I/O devices 632. In other examples, other standardized bus protocols, such as Ultra Path Interconnect (UPI) can be used for the host bus. In other examples, a proprietary bus protocol can be used.

The example acceleration engine 600 further includes DMA engines 646a-646d that can move data between the accelerators 602a-602n, DRAM controllers 642a-642k, and I/O controllers 644a-644p. In the illustrated example, the acceleration engine 600 includes dDMA engines 646a-646d.

In some implementations, the DMA engines 646*a*-646*d* can be assigned to specific tasks, such as moving data from the DRAM controllers 642*a*-642*d* to the accelerators 602*a*-602*n*, or moving data between the I/O controllers 644*a*-644*p* and the accelerators 602*a*-602*n*. These tasks can be assigned, for example, by enqueueing descriptors with the DMA engines 646*a*-646*d*, where a descriptor identifies an address for a block of data and an operation (e.g., a read or a write) to perform. A descriptor, for example, can direct a DMA engine to instruct a DMA controller to read a block of data from DRAM 630. A descriptor can, as a further example, instruct the DMA engine to write data, read by the DMA controller, to an accelerator. Further descriptors can be used to move data from an accelerator to DRAM 630.

In the example acceleration engine 600, the various components can communicate over a chip interconnect 620. The chip interconnect 620 primarily includes wiring for routing data between the components of the acceleration engine 600. In some cases, the chip interconnect 620 can include a minimal amount of logic, such as multiplexors to control the direction of data, flip-flops for handling clock domain crossings, and timing logic.

Figure 7:
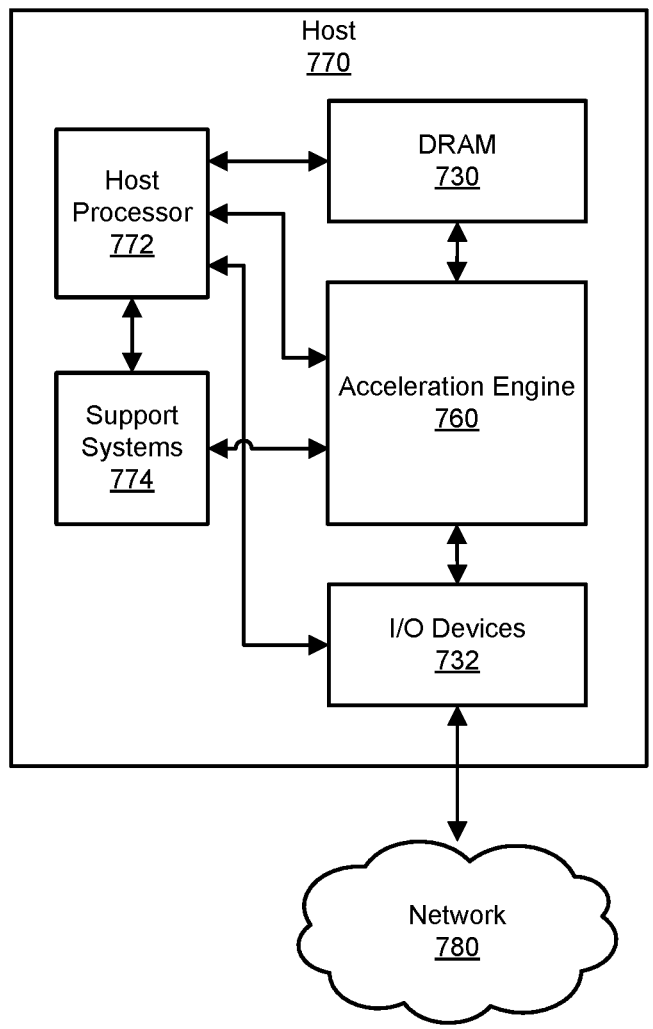
FIG. 7 includes a block diagram that illustrates an example of a host system.

FIG. 7 includes a block diagram that illustrates an example of a host system 770 in which an acceleration engine 760 can be used. The example host system 770 includes the acceleration engine 760, a host processor 772, DRAM 730 or processor memory, I/O devices 732, and support systems 774. In various implementations, the host system 770 can include other hardware that is not illustrated here.

The host processor 772 is a general purpose integrated circuit that is capable of executing program instructions. In some examples, the host processor 772 can include multiple processing cores. In some examples, the host system 770 can include more than one host processor 772. In some examples, the host processor 772 and the acceleration engine 760 can be one chip, such as, for example, one or more integrated circuits within the same package.

The DRAM 730 can include memory that is used by the host processor 772 for storage of program code that the host processor 772 is in the process of executing, as well as for storage of values that are being operated on by the host processor 772. In some examples, the DRAM 730 is also accessible to the acceleration engine 760. In some examples, the DRAM 730 includes separate memory or memory banks for processor memory and for use by the acceleration engine 760. That is, the DRAM 730 can be at least two physically separate memories, with one memory being accessible to the host processor 772 and not directly accessible to the acceleration engine 1060, and the other memory being accessible to the acceleration engine and not directly accessible to the host processor 772. DRAM is a common term for small, fast memory used for processor memory, and though DRAM is volatile memory, in various examples volatile and/or non-volatile memory can be used.

The I/O devices 732 can include hardware for connecting to user input and output devices, such as keyboards, monitors, and printers, among other devices The I/O devices 732 can also include storage drives and/or a network interface for connecting to a network 780.

In various implementations, the support systems 774 can include hardware for coordinating the operations of the acceleration engine 760. For example, the support systems 774 can include one or more data management processors, which can management the movement of data into and out of on the acceleration engine 760. In some examples, the data management processors and the acceleration engine 760 can be on one chip, such as one integrated circuit on the same die and in the same package.

In various examples, software programs executing on the host processor 772 can receive or generate input for processing by the acceleration engine 760. The programs can include, for example, graphics intensive programs such as video games or computer-aided design programs, computationally intensive programs such as modeling programs, or artificial intelligence programs such as speech recognition or image recognition programs. In various examples, the host processor 772 can determine to offload operations on input received from such programs to the acceleration engine 760, which can perform the operations more quickly than the host processor 772.

To assist the host processor 772 in using the acceleration engine 760, the host processor can be executing a device driver or driver program for the acceleration engine 760. Similar to any other hardware driver, the driver program for the acceleration engine 760 can provide an interface through which an operating system can send requests to the acceleration engine 760 and receive results. Upon receiving a request, which can include data and an operation to be performed on the data, the driver program can handle execution of the operation by the acceleration engine 760, leaving the operating system free to perform other operations.

In various examples, handling a request for the acceleration engine 760 can including programming and activating a data management processor, which may be a component in the support systems 774 or in the acceleration engine 760. Programming the data management processor can include, for example, triggering a DMA transaction to copy program code from the DRAM 730 into the data management processor, and triggering the data management processor to execute the code. The copying and the triggering can be performed, for example, by the driver program. Alternatively, the copying and the triggering can be performed by way of DMA transactions. Once the data management processor begins executing code, the driver program need not take further action until the operation being performed by the accelerator engine 760 is finished.

In various examples, the code executed by the data management processor can configure the acceleration engine 760, including copying program code and input data into the accelerator engine 760 and triggering the accelerator engine 760 to being execution of the code. The data management processor can wait on the acceleration engine 760 to finish perform the operation, and can then copy any result of the operation from the acceleration engine 760 and into DRAM 730, for example, the data management processor can then inform the driver program that results are ready, which can then inform the operating system or the program for which the result was computed.

In some examples, the operations of the support systems 774 can be handled by the host processor 772. In these examples, the support systems 774 may not be needed and can be omitted from the host system 770.

Figure 8:
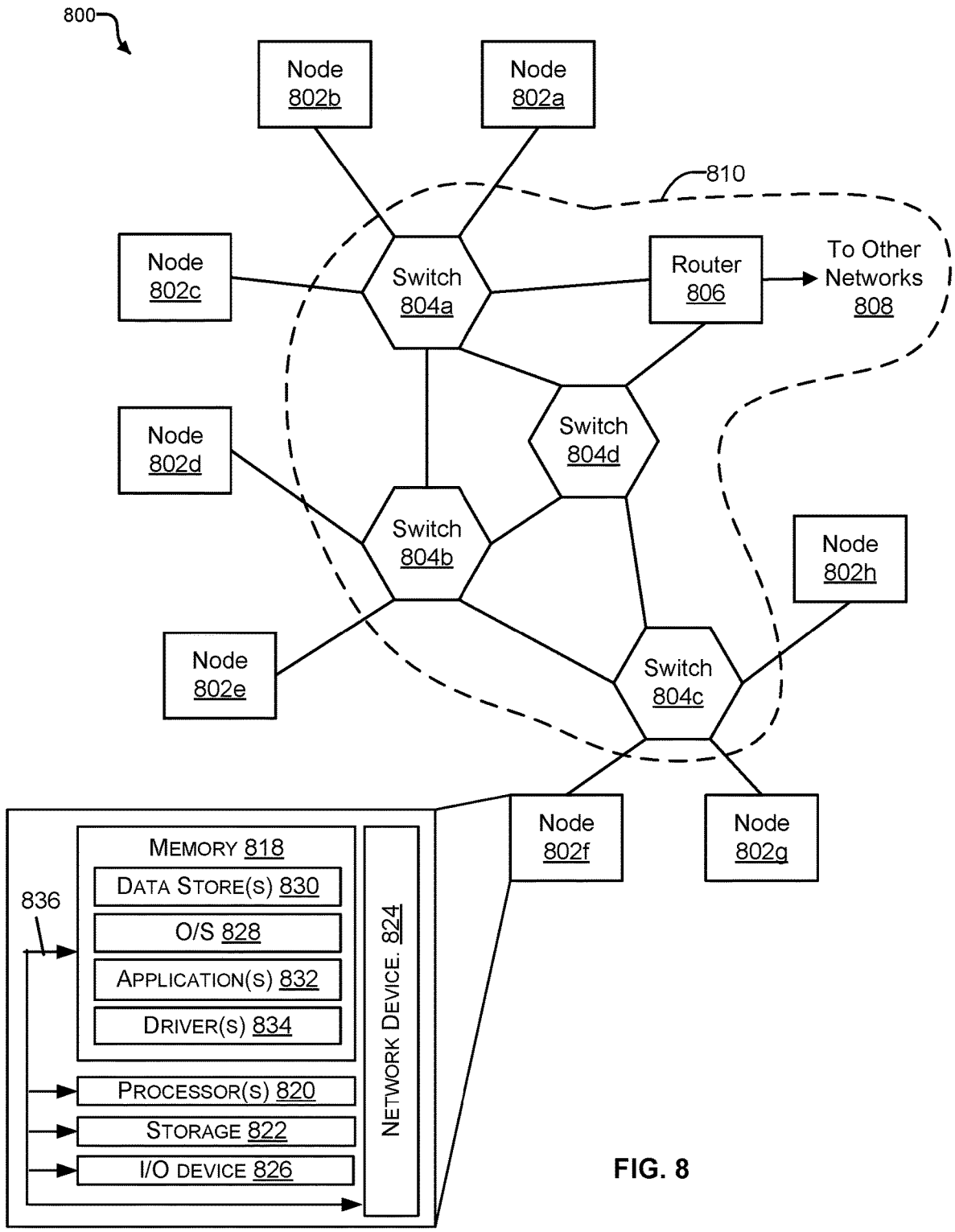
FIG. 8 includes a diagram of an example network.

FIG. 8 includes a diagram of an example network 800, which can include one or more host systems, such as the host system illustrated in FIG. 7. For example, the example network 800 of FIG. 8 includes multiple nodes 802*a*-802*h*, one or more of which can be a host system such as is illustrated in FIG. 7. Others of the nodes 802*a*-802*h* can be other computing devices, each of which include at least a memory for storing program instructions, a processor for executing the instructions, and a network interface for connecting to the network 800.

In various examples, the network 800 can be used to process data. For example, input data can be received at one of the nodes 802a-802h or from other networks 808 with which the network 800 can communicate. In this example, the input data can be directed to a node in the network 800 that includes an acceleration engine, for the acceleration engine to operate on and produce a result. The result can then be transferred to the node or other network from which the input data was received. In various examples, input data can be accumulated from various sources, including one or more of the nodes 802a-802h and/or computing devices located in the other networks 808, and the accumulated input data can be directed to one or more host systems in the network 800. Results from the host systems can then be distributed back to the sources from which the input data was gathered.

In various examples, one or more of the nodes 802a-802h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 8, the nodes 802a-802h are connected to one another using a switched architecture with point-to point links. The switched architecture includes multiple switches 804a-804d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 804a-804d of FIG. 8 may be connected to the nodes 802a-802h and provide multiple paths between any two nodes.

The network 800 may also include one or more network devices for connection with other networks 808, such as a router 806. Routers use headers and forwarding tables to determine the best path for forwarding the packets, and use protocols such as internet control message protocol (ICMP) to communicate with each other and configure the best route between any two devices. The router 806 of FIG. 8 can be used to connect to other networks 808 such as subnets, LANs, wide area networks (WANs), and/or the Internet.

In some examples, network 800 may include any one or a combination of many different types of networks, such as cable networks, the Internet, wireless networks, cellular networks and other private and/or public networks. The interconnected switches 804a-804d and the router 806, if present, may be referred to as a switch fabric 810, a fabric, a network fabric, or simply a network. In the context of a computer network, terms "fabric" and "network" may be used interchangeably herein.

The nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

FIG. 9 includes a flowchart illustrating an example of a process 900 for operating an integrated circuit device. In various examples, integrated circuit device can be an accelerator, such as is described in FIGS. 1-4. The integrated circuit device can include a plurality of memory banks and an execution engine that included a set of execution components. Each execution component can be associated with a memory bank form the plurality of memory banks, and each execution may only be able to read or write to the memory bank with which the execution component is associated. The integrated circuit device can further include a set of registers that are each associated with a memory bank from the plurality of memory banks.

In various examples, the integrated circuit device can be operable to load to or store from the set of registers in parallel. Loading or storing in parallel can result in data being moved between a register from the set of registers and a respective memory bank. For example, a parallel load can result in data being read from the memory banks and the data being loaded into the set of registers, with each register receiving data from the memory bank with which the register is associated. As another example, a parallel store can result in data stored in the registers being written to the memory banks, with each register providing data for the memory bank with which the register is associated.

The integrated circuit device can further be operable to load to or store from the set of registers serially. Loading or storing serially results in data being moved between one or more registers from the set of registers and one memory bank from the plurality of memory banks. For example, a serial load can involve data being read from one memory bank, and being loaded serially into the registers, with each register receiving different segment of the data. In some examples, the amount of data stored in each register can be specified in an instruction that causes the loading. As another example, a serial store can involve data being read from each register and being written to the one memory bank. In this example, the data in registers is accumulated into the one memory bank.

At step 902, the process 900 of FIG. 9 includes reading values in parallel from memory banks of the integrated circuit device, wherein reading in parallel results in a value being read from each of the memory banks. In various examples, the values are each read from similar addresses in each of the memory banks, such as the first address in the address space of each memory bank, or addresses that are at the same offset within each of the memory banks. In some example, an instruction that triggers the read operation of step 902 can specify the addresses from which the values are read. In some examples, the read operation is performed using a fixed address. In some examples, the integrated circuit device can include additional memory banks that are not read at step 902.

At step 904, the process 900 includes loading the values into the set of registers of the integrated circuit device, wherein each register loads a value from a respective memory bank. At the conclusion of step 904 each value read at step 902 is stored in a different register from the set of registers. In some examples, fewer than all of the registers are needed.

At step 906, the process 900 includes reading the values from the set of registers serially, wherein reading serially results in the values being read from each of the set of registers. Step 906 can result in each value read at step 902 and loaded in step 904 being serialized into a single data stream.

At step 908, the process 900 includes writing the values to one memory bank from the memory banks. That is, the serialized stream of data of step 906 is written to the one memory bank. As a result of steps 902 through 908, data is moved from multiple memory banks to the one memory bank.

At step 910, the process 900 includes reading the values from the one memory bank into an execution engine of the integrated circuit device. As noted previously, the execution engine can include a set of execution components, wherein each execution component is associated with a memory bank from the memory banks, wherein each execution component can read or write to only the memory bank with which the execution component is associated. The values read at step 910 an be read into an execution component associated with the one memory bank. As a result of step 910, the execution component obtains the values read at step 902 from multiple memory banks, which are otherwise inaccessible to the execution component. In various examples, the execution component can perform an operation on the values.

The set of registers of the integrated circuit device can be used in different ways. For example, the integrated circuit device can include an instruction memory that can be used to store instructions for using the set of registers. The instructions can include, for example, a first instruction that causes the integrated circuit device to perform a parallel load of the set of registers, and a second instruction subsequently causes the integrated circuit device to perform a serial store from the set of registers. In some examples, prior to execution of the first instruction, the set of execution components of the execution engine write a set of values to respective memory banks. In these examples, the first instruction causes the set of values to be loaded into respective registers, and the second instruction causes the set of values to be written to the one memory partition. In some examples, an execution component of the execution engine reads a set of values from the one memory bank subsequent to execution of the second instruction, and may perform an operation using one or more of the set of values.

As another example, the instructions can include a first instruction that causes the integrated circuit device to perform a serial load of the set of registers, and a second instruction subsequently causes the integrated circuit device to perform a parallel store from the set of registers. In some examples, prior to execution of the first instruction, an execution component of the execution engine writes a set of values to the one memory partition. In these examples, the first instruction causes the set of values to be loaded into the set of registers, and the second instruction causes the set of values to be written to respective memory banks. In some examples, the set of execution components read a set of values from respective memory banks subsequent to execution of the second instruction, and may each perform an operation on a respective value.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit device, comprising:
   a plurality of memory banks;
   an execution engine including a set of execution components, wherein each execution component is associated with a respective memory bank from the plurality of memory banks, wherein each execution component is configurable to perform an operation on data read from a respective memory bank, and wherein each execution component can read from or write to only the respective memory bank with which the execution component is associated; and
   a set of registers each associated with a respective memory bank from the plurality of memory banks;
   wherein the integrated circuit device is operable to:
      read values from the plurality of memory banks in parallel, wherein reading in parallel results in a value being read from each memory bank;
      store the values in the set of registers, wherein each register stores a value from a respective memory bank;
      read the values from the set of registers serially, wherein reading serially results in the values being read from each of the set of registers; and
      write the values to one memory bank from the plurality of memory banks.

2. The integrated circuit device of claim 1, wherein the execution engine writes the values from the set of execution components to the plurality of memory banks after the set of execution components compute the values.

3. The integrated circuit device of claim 1, wherein the execution engine reads the values from the one memory bank and uses an execution component from the set of execution components to perform an operation on the values.

4. The integrated circuit device of claim 1, wherein the integrated circuit device is further operable to:

read additional values from the one memory bank;
store the additional values serially to the set of registers, wherein storing serially results in the values being stored individually into the set of registers;
read the additional values from the set of registers; and
write the additional values to the plurality of memory banks in parallel, wherein writing in parallel results in a value from the additional values being written to each of the plurality of memory banks.

5. An integrated circuit device, comprising:
a plurality of memory banks;
an execution engine including a set of execution components, wherein each execution component is associated with a respective memory bank from the plurality of memory banks, and wherein each execution component can read from or write to only the respective memory bank with which the execution component is associated; and
a set of registers each associated with a respective memory bank from the plurality of memory banks;
wherein the integrated circuit device is operable to:
load to or store from the set of registers in parallel, wherein loading or storing in parallel results in data being moved between a register of the set of registers and a respective memory bank; and
load to or store from the set of registers serially, wherein loading or storing serially results in data being moved between one or more registers from the set of registers and one memory bank from the plurality of memory banks.

6. The integrated circuit device of claim 5, further comprising:
an instruction memory operable to store a first instruction and a second instruction, wherein a first instruction causes the integrated circuit device to perform a parallel load of the set of registers, and wherein a second instruction subsequently causes the integrated circuit device to perform a serial store from the set of registers.

7. The integrated circuit device of claim 6, wherein the set of execution components write a set of values to respective memory banks prior to the first instruction being executed, wherein the first instruction causes the set of values to be loaded into respective registers, and wherein the second instruction causes the set of values to be written to the one memory bank.

8. The integrated circuit device of claim 6, wherein an execution component of the execution engine reads a set of values from the one memory bank subsequent to execution of the second instruction.

9. The integrated circuit device of claim 5, further comprising:
an instruction memory operable to store a first instruction and a second instruction, wherein a first instruction causes the integrated circuit device to perform a serial load of the set of registers and wherein a second instruction subsequently causes the integrated circuit device to perform a parallel store from the set of registers.

10. The integrated circuit device of claim 9, wherein an execution component of the execution engine writes a set of values to the one memory bank prior to execution of the first instruction, wherein the first instruction causes the set of values to be loaded into the set of registers, and wherein the second instruction causes the set of values to be written to respective memory banks.

11. The integrated circuit device of claim 9, wherein the set of execution components read a set of values from respective memory banks subsequent to execution of the second instruction.

12. The integrated circuit device of claim 5, further comprising:
an instruction execution engine operable to execute a first instruction to load to the set of registers and a second instruction operable to execute a second instruction to store from the set of registers.

13. The integrated circuit device of claim 12, wherein the first instruction and the second instruction include a parameter for specifying whether to perform a parallel load or store or a serial load or store.

14. The integrated circuit device of claim 12, wherein the first instruction and the second instruction include a parameter for identifying one or more registers from the set of registers.

15. The integrated circuit device of claim 12, wherein the first instruction and the second instruction include a parameter for specifying a memory address.

16. The integrated circuit device of claim 12, wherein the first instruction and the second instruction include a parameter for specifying an amount of data to be moved into or out of each register from the set of registers.

17. The integrated circuit device of claim 12, further comprising:
a set of multiplexors for each of the set of registers, wherein each multiplexor from the set of multiplexors enables a respective register from the set of registers to load a value from any other register in the set of registers.

18. The integrated circuit device of claim 5, wherein the execution engine is an activation engine, a pooling engine, or a Direct Memory Access (DMA) engine.

19. The integrated circuit device of claim 5, wherein the integrated circuit device comprises a neural network accelerator.

20. A computer-implemented method for operating an integrated circuit device, comprising:
reading, by the integrated circuit device, values in parallel from memory banks of the integrated circuit device, wherein reading in parallel results in a value being read from each of the memory banks;
loading the values into a set of registers of the integrated circuit device, wherein each register loads a value from a respective memory bank;
reading the values from the set of registers serially, wherein reading serially results in the values being read from each of the set of registers;
writing the values to one memory bank from the memory banks; and
reading the values from the one memory bank into an execution engine of the integrated circuit device, the execution engine including a set of execution components, wherein each execution component is associated with a respective memory bank from the memory banks, wherein each execution component can read or write to only the respective memory bank with which the execution component is associated, and wherein the values are read into an execution component associated with the one memory bank.

21. The computer-implemented method of claim 20, wherein a first execution engine of the integrated circuit device computes the values and writes the values in parallel to the memory banks.

22. The computer-implemented method of claim 20, wherein the execution engine combines the values to produce one result.

* * * * *